Sept. 4, 1928.
J. HOYLE ET AL
1,682,967
RAKE ATTACHMENT FOR CULTIVATORS
Filed Jan. 31, 1927
Fig. 1.
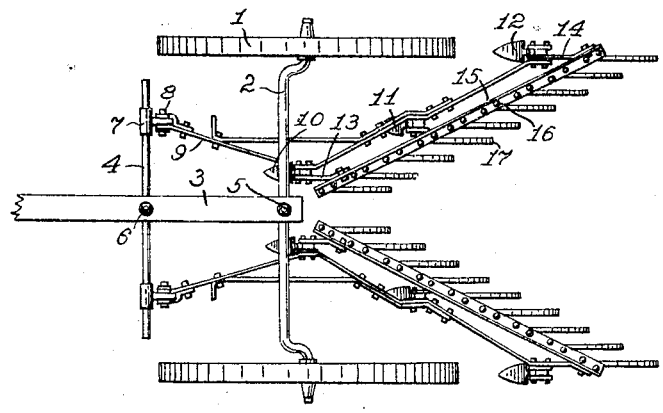
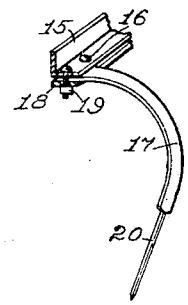
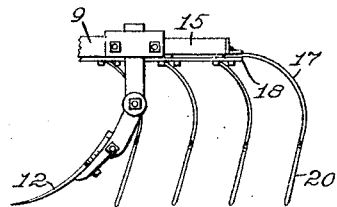
Fig. 3.
Fig. 2.
Inventors
John Hoyle, and
Stephen T. Short,
By
Attorney Patented Sept. 4, 1928.

1,682,967

UNITED STATES PATENT OFFICE.

JOHN HOYLE AND STEPHEN T. SHORT, OF BUCHANAN COUNTY, IOWA.

RAKE ATTACHMENT FOR CULTIVATORS.

Application filed January 31, 1927. Serial No. 164,807.

Our invention relates to improvements in rank attachments for cultivators, and the object of our improvement is to combine with the shovel gangs of a cultivator a plurality of elastic tines mounted in the track thereof in such a manner and relative positions as to serve adequately in helping to uproot weeds turned up by the shovels, bring them upon the surface of the soil and so distributed thereupon as to insure of their destruction.

This object we have accomplished by the means which are hereinafter described and claimed, and which are illustrated in the accompanying drawings, in which Fig. 1 is a top plan of a conventional cultivator, showing in combination with the shovel gangs thereof the raking members which are mounted in the track thereof. Fig. 2 is a fragmentary view, on a larger scale, showing the means used for mounting said raking members upon the gang frame. Fig. 3 is a perspective detail view of a single raking member or elastic tine as mounted upon its carrying bar.

Minor modifications, it will be understood, are inculded in the scope of protection of the claim herein.

The conventional cultivator shown is of the parallel-beam type, but any other type may be combined with our said improvement. In this machine, a bowed axle 2 is mounted on carrying wheels 1 and is medially secured at 5 to the rear end of a pole or tongue 3, and below said pole a transverse rod 4 is medially fastened at 6. On the oppositely directed end parts of this rod 4 are slidably mounted sleeves 7 to which are pivoted at 8 the forward ends of like but reversed gang-frames 9. The general direction of each gang-frame is oblique horizontally relative to the medial line longitudinally of the cultivator, and being reversed, the frames from points below the axle converge at their forward ends. This is the usual arrangement including the plurality of soil working implements or shovels 10, 11 and 12 whose shanks are mounted fixedly in the gang-frames.

The numerals 13 and 14 denote longitudinally directed bracket-bars fixedly secured to the forward and rear parts of the gang-frames 9, and on each pair are rigidly mounted near their opposite ends angle-bars 15 arranged in substantial parallelism to the parts of the gang-frames between said bracket-bars which are convergent as before stated.

Referring to said Figs. 2 and 3, the numeral 18 denotes a flat bar below and spaced from the horizontal flange of each angle-bar 15 and secured thereto by means of a number of pairs of bolts 16 which clamp in their interspace the upper end parts of a plurality of elastic curvate tines 17, the bolts being held by nuts 19. Each tine has its upper curved part 17 flattened to render it more elastic to swing upwardly and rearwardly than the cylindrical lower part 20 which is stiffer, and each tine is independently laterally swingingly adjustable when the nuts are loosened.

The tines 17 are positioned to drag behind and in the general track of the shovels 10, 11 and 12, extending longitudinally of the cultivator.

The function of the said elastic tines is to drag through the soil loosened by the shovels ahead, to detach, throw out and spread upon the surface of the soil weeds which are thus separated from the soil and left entirely uncovered to dry up and become destroyed without re-rooting. Because of the arrangement of both the shovels and the tines in echelon, with the gangs reversed to converge to the front, weeds so thrown upon the surface of the soil are directed laterally and left upon parts of the soil at the sides of the cultivator to a large extent, and where they cannot become re-rooted, especially in line with planted rows of seed. The elasticity of the curvate flat parts of the tines permits them to yield somewhat without breaking when encountering immovable obstructions, and the stiffer cylindrical points 20 dig into the soil readily to dig out weed roots in their way which may not have become detached by the shovels.

The independent lateral swinging adjustment of each tine is convenient in the arranging of the tines relative to each other in certain cases, without changing the positions of the other tines or the paired bars 15–18 relative to the line of draft.

Having described our invention, what we claim as new, and desire to secure by Letters Patent, is:

In a cultivator, a pair of like but reversed bipartite gang frames, independently movable, and positioned side by side, gangs of shovels rigidly mounted on forward parts of said frames and in echelon thereon, with the gangs on one frame reversed in alinement relative to the other gang, the other parts of said frames being vertically spaced apertured horizontal bars mounted in parallelism to the rear of the forward parts of said frames, and tines having their forward ends clamped between said spaced bars, the forward parts being transversely flattened, elastic, and curved downwardly, the free terminations of the tines being cylindrical, rigid and pointed, and removable fastening devices in the apertures of said spaced bars to clamp a tine between each adjacent pair thereof, permitting when the said devices are loosened, independent lateral swinging adjustments of each curvate tine relative to the line of draft of the said bars and gang frame.

In testimony whereof we affix our signatures.

JOHN HOYLE.
STEPHEN T. SHORT.